United States Patent Office 2,969,537
Patented Jan. 24, 1961

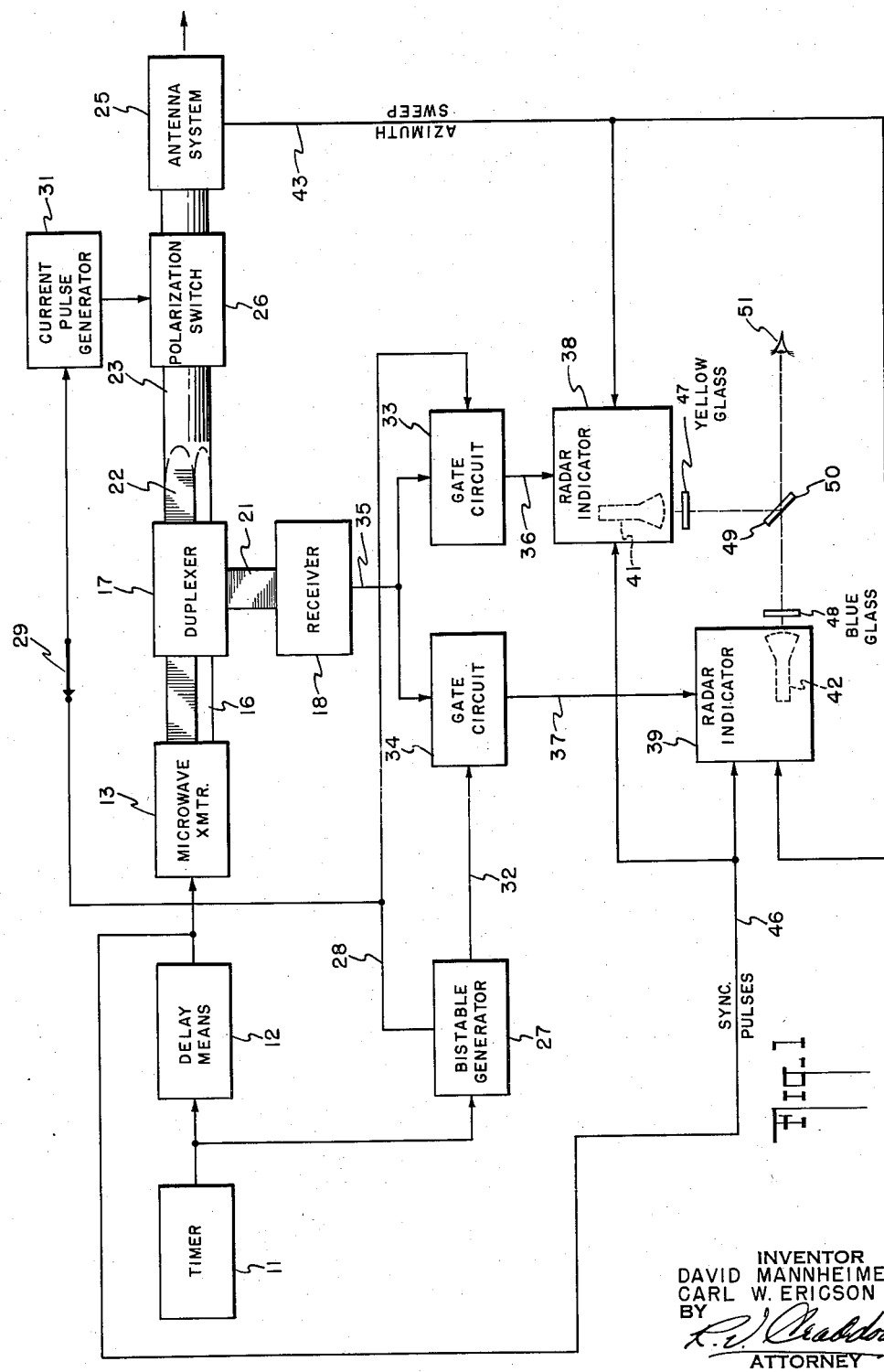

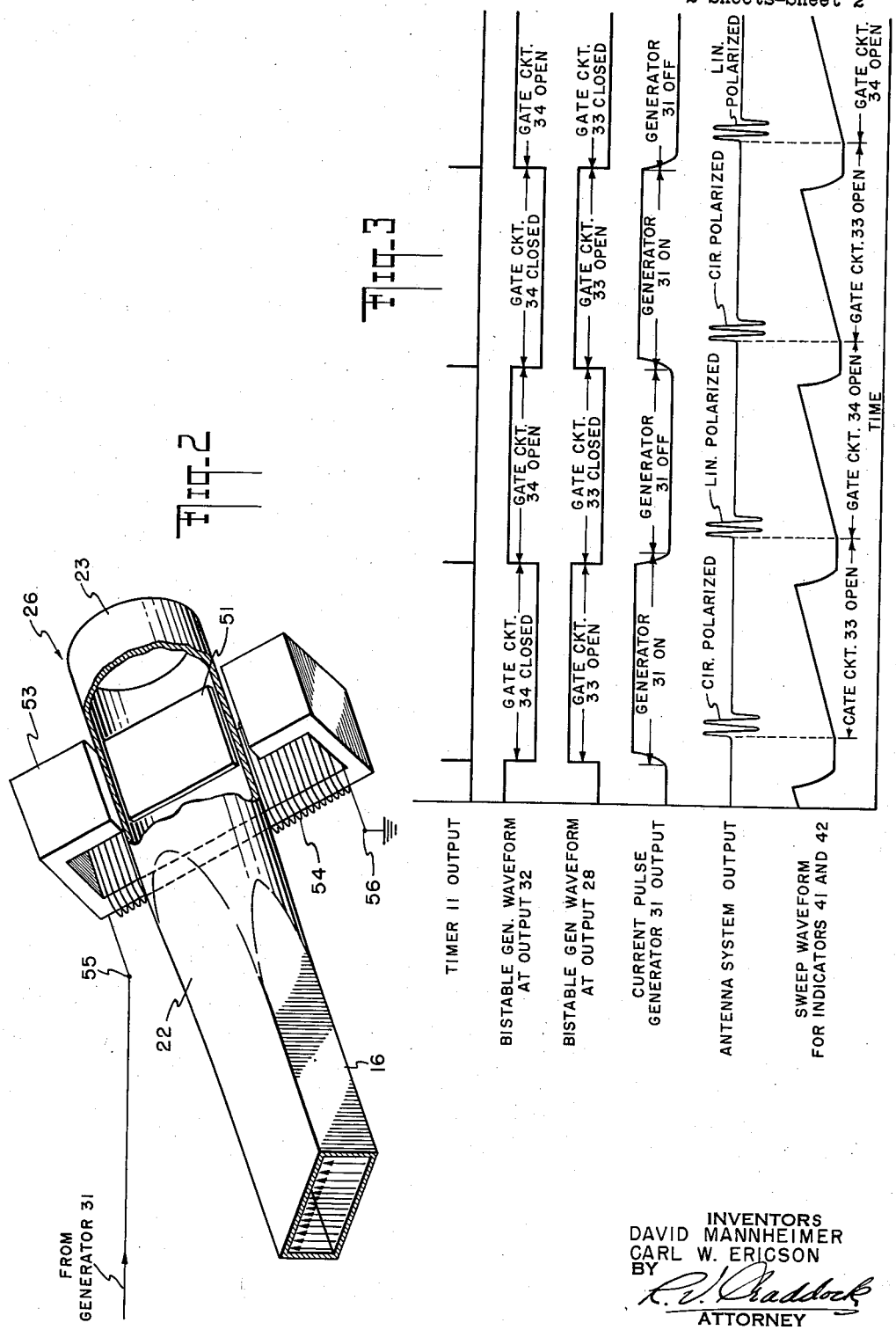

2,969,537
TARGET DISCRIMINATING RADAR SYSTEM

David Mannheimer, Bayville, N.Y., and Carl W. Ericson, Jr., Van Nuys, Calif., assignors to Sperry Rand Corporation, Great Neck, N.Y., a corporation of Delaware Filed May 7, 1957, Ser. No. 657,999

5 Claims. (Cl. 343—11)

The present invention is related to radio navigational systems. It is particularly concerned with navigational radar systems for discriminating between solid object targets and intense weather targets such as storm concentrations.

To a certain extent existing radar systems can separate intense weather targets from solid object targets since an indication on the radar screen for a weather target can often be distinguished by its less sharply defined boundaries from an indication for a solid object. The skill of the radar system operator in interpreting the indications plays an important part in distinguishing between such targets. However, in the case of a weather target such as an intense and localized storm concentration near the ground in mountainous terrain, it has heretofore been extremely difficult even for the most skilled of radar operators to distinguish between the storm concentration and the terrain.

Intense weather targets generally involve high turbulence. Flight by an aircraft through turbulent areas can be extremely dangerous and is generally desired to be avoided. Since it is often difficult for radar systems heretofore known in the art to satisfactorily distinguish weather return from ground return, they are inadequate for use aboard an aircraft for providing a reliable early warning of impending intense weather near the ground, particularly in mountainous areas.

Therefore, it is an object of the present invention to provide a radar system having improved means for discriminating between solid object and weather targets.

It is a further object to provide a radar system capable of producing clearly different indications for solid and weather targets even where a weather target lies near the ground.

It is yet another object of the invention to provide a radar system for use aboard an aircraft to provide an unambiguous warning in mountainous areas of intense weather concentrations involving high turbulence.

It is a further object to provide a radar system having an indicator for displaying solid object and weather targets in different colors.

It is still another object to provide means for readily modifying a conventional radar system by the addition of a relatively few components thereto for vastly improving the ability of the system to distinguish between solid object targets and intense weather targets.

The foregoing and other objects and advantages of the present invention, which will become more clear from the detailed description below, are attained by a radar system which alternately transmits linearly and circularly polarized pulses of microwave energy for target detection. The system further includes means for discriminating between energy reflected from solid object targets and weather targets in response to incident circularly polarized wave energy so as to detect primarily solid object return, and means for providing optical information of a certain color in response to the aforementioned solid object detection. Means are further utilized for providing detection of both solid object and weather target return in response to incident linearly polarized wave energy, while providing optical information of another color in response to this further detection. Combining means are provided for response to the differently colored optical information to present solid object targets in one color and weather targets in another.

Referring now to the drawings:

Fig. 1 is a schematic diagram of the system of the present invention;

Fig. 2 is a perspective view of a form of a polarization switch for the system illustrated in Fig. 1; and Fig. 3 comprises a waveform diagram for showing the timing relationship between waveforms at various points in the system of Fig. 1.

Referring now to Fig. 1, the block 11 designates a timer or synchronizer for producing a series of recurrent trigger pulses at a desired radar system repetition rate determined in accordance with principles known in the art. The output pulses from timer 11 are utilized for triggering a radar system transmitter 13 and as synchronizing signals for other components in the radar system.

A delay means 12 such as an artificial transmission line or electronic trigger pulse delay device is provided between the output of the timer 11 and the trigger input lead for transmitter 13. The trigger pulses are delayed for several microseconds before being applied to transmitter 13 for reasons which will become apparent further below.

Transmitter 13 is of the externally pulsed type comprised of suitable means for generating a high-power pulse of microwave energy of desired width for each trigger pulse supplied thereto. The duration of the transmitted pulses might be of the order of 5-microseconds, for example, the peak power of the pulses being sufficient for adequate detection of radar targets up to 140 nautical miles for an air-borne system, for example.

The carrier frequency of the microwave oscillations of the transmitted pulses is restricted since if too high, the transmitted pulses will not adequately penetrate rain to reach a target. If the frequency is too low, poor angular resolution is obtainable. Where antenna size is not limited, an ideal weather radar system might operate at a carrier frequency for an operating wavelength of 7.5 cm., for example. Where antenna size is critical and required to be small as is generally the case for an airborne system, operation at a frequency for a wavelength between 3.2 cm. (X-band) and 5 cm. (C-band) is desirable.

The transmitter 13 is adapted to excite a rectangular wave guide 16 in its dominant $TE_{10}$ mode. A microwave duplexer system 17 is provided along wave guide 16 for ensuring passage of the transmitted pulses of high-power microwave energy to the radar system antenna without damage to the radar system receiver 18, while ensuring efficient return of reflected or echo energy to the receiver 18 by way of a rectangular wave guide 21 connected between the receiver 18 and duplexer 17.

The rectangular wave guide 16 is continuous from one side to the other of duplexer 17. A rectangular to circular wave guide transition section 22 is provided along wave guide 16 for efficient transfer of microwave energy from wave guide 16 to a circular wave guide 23 in coaxial alignment therewith. The transition section 22 efficiently transforms the transmitted pulses of microwave energy in wave guide 16 in the $TE_{10}$ mode to the dominant $TE_{11}$ mode for the circular wave guide 23. The foregoing transmitted pulses of microwave energy in wave guides 16 and 23 are linearly polarized in a direction perpendicular to the broad walls of wave guide 16.

A polarization switch 26 is provided along wave guide 23 for converting alternate transmitted pulses of microwave energy in wave guide 23 into circularly polarized energy. The foregoing conversion is made a function of the presence of a pulse of current supplied to switch 26 by a current pulse generator 31 operated during alternate intervals between trigger pulses from timer 11. Thus, transmitted linear polarized pulses of microwave energy occurring during the foregoing alternate intervals are converted into circularly polarized pulses by switch 26. These circularly polarized pulses are carried by the remaining portion of circular wave guide 23 to the radar antenna system 25.

During the other alternate intervals between trigger pulses from timer 11, the generator 31 is off. The switch 26 functions during these other alternate intervals so that linear polarized pulses of energy in wave guides 16 and 23 at the input to switch 26 emerge from switch 26 as linear polarized pulses. Thus, the radar antenna system 25 radiates linearly polarized pulses of energy during the foregoing other alternate intervals and circularly polarized pulses during the first mentioned alternate intervals. The particular timing relationship for the foregoing is indicated in Fig. 3. The details of a suitable polarization switch 26 are shown in Fig. 2, and will be described more completely further below.

The radar antenna system 25 should be preferably of a type having circular symmetry to radiate and receive circular or linear polarized energy without adversely affecting the polarization. If the radar system is employed for aircraft navigation, its antenna should be directional and scan a lateral area in azimuth of ±90 degrees, for example. The antenna should be designed so that the radar system can resolve storm concentrations from 3 degrees to 5 degrees of bearing, for example. An an-antenna for operation at a carrier frequency in the X-band for an airborne system might comprise a circular paraboloidal reflector fed by an open end of circular wave guide 23. The reflector for such an antenna should have a diameter of from 18 inches to 30 inches, for example.

The trigger pulses from timer 11 are also supplied to a bistable generator 27 having two outputs 28 and 32 whereat voltage waveforms of opposite phase are produced. Generator 27 comprises a multivibrator, for example, wherein leads 28 and 32 represent the outputs of two tubes thereof, one tube of which is on while the other is off. Each trigger pulse from timer 11 reverses the foregoing on-off relationship of the multivibrator tubes so that a positive voltage output excursion occurs at lead 28 simultaneously with a negative voltage output excursion at lead 32 during alternate intervals between pulses from timer 11. The reverse is the case during the other alternate intervals between pulses from timer 11, as is indicated in Fig. 3.

The current pulse generator 31, which includes a vacuum tube normally biased below cut-off, for example, is adapted to be responsive to a positive pulse excursion at lead 28 from generator 27 if switch 29 in an input lead for generator 31 is closed as indicated in Fig. 1. A positive pulse excursion at lead 28 is utilized for overcoming the cut-off bias of generator 31 so that it becomes conductive. Generator 31 stays conductive until a negative voltage excursion appears at lead 28 as indicated in the waveform diagram of Fig. 3. When generator 31 is conductive, current is applied to the polarization switch 26. When generator 31 is non-conductive no current is supplied to switch 26. In case the system is desired to be operated as a conventional radar without transmission of circularly polarized waves for solid object-heavy weather target discrimination, switch 29 is adjusted to its open position so that generator 31 will remain cut-off.

The outputs from the bistable generator 27 at leads 28 and 32 are also supplied to selector or gate circuits 33 and 34, respectively. The gate circuits 33 and 34 comprise first and second pentode tubes, respectively, for example. The control grid input circuits of the aforementioned pentode tube gate circuits are connected in parallel for receiving detected video pulse energy from the radar receiver 18 at its output lead 35. The suppressor grids of the foregoing tubes are biased negatively relative to the cathodes thereof for cut-off of plate current in the tubes, and receive the outputs from leads 28 and 32, respectively. A positive voltage excursion at either of the outputs 28, 32 of generator 27 is utilized for raising the suppressor grid of the pentode gate circuit to which it is supplied above cut-off and conducting.

If the pentode in either of the gate circuits 33 or 34 is conducting, the gate is considered open for passage of detected video pulse energy therethrough. If the pentode is operated so that its plate current is cut off, the gate circuit containing the non-conducting pentode is closed and no detected video pulse energy passes therethrough. The outputs of the gate circuits 33 and 34 appear at the plates of the foregoing pentodes. These outputs are supplied by leads 36 and 37 to indicators 38 and 39, respectively, for application to the control grids of cathode ray tubes 41 and 42, respectively, for intensity modulating their electron beams.

The cathode ray tubes 41 and 42 are adapted for a type B-scan presentation, for example. The horizontal deflecting means of each tube is supplied by a suitable positional signal upon lead 43 from suitable means in the antenna system 25 so that the position of the vertical sweep of each cathode ray tube beam is aligned with the position in azimuth of the antenna. The vertical deflecting means of each tube is supplied by a suitable waveform signal provided by a sweep generator in each indicator circuit for providing a range sweep.

The synchronizing pulses for the sweep generator in each of indicators 38 and 39 is obtained from lead 46 connected to the output of the delay means 12. The sweep generator waveform provided in each of indicators 38 and 39 for the vertical deflecting means of its cathode ray tube is indicated in the waveform diagram of Fig. 3, the beginning of each sweep coinciding with a transmitted radar pulse. The timing of the sweep generator waveforms of indicators 38 and 39 should be regulated so that the sweep is completed during each interval between the trigger pulses from timer 11, as is indicated in Fig. 3. The duration of the forward sweep is regulated so that reflected energy from a target at a maximum range for the system will be detected before a return sweep.

The cathode ray tubes 41 and 42 are disposed in the same plane with their axes at right angles to each other. A pair of differently colored filters comprising yellow and blue glass plates 47 and 48, for example, are positioned opposite the screens of the cathode ray tubes 41 and 42 in planes at right angles with two axes of tubes 41 and 42, respectively. A mirror 49 having a half silvered surface 50 is placed at the intersection of the axes of the tubes 41 and 42 in 45° relationship therewith as illustrated in Fig. 1.

The light from the screen of tube 42 representing a target passes through the filter 48 and mirror 49 on a direct path to the eye 51 of an observer. Light from the screen of tube 41 representing a target passes through the filter 49 and is reflected by the half silvered surface 50 of mirror 49 to the eye 51 of the observer. Whenever light is present from corresponding points on the screens of tubes 41 and 42, it follows coincident paths from mirror 49 to the eye 51 of the observer and combines to appear gray in color. The mirror 49 should have suitable calibrations for azimuth target position information. Ranging markers are also provided by electronic means as is common in the art.

The operation of the radar system for solid object-weather target discrimination is based on the phenomenon that weather targets such as drops of rain or rain bearing cloud formations, for example, have spherical characteristics. Thus, reflected radar energy from intense weather targets is mostly circularly polarized if the incident energy is circularly polarized. It is a further phenomenon that solid object targets have non-spherical characteristics so reflect mostly elliptically polarized energy in response to incident circularly polarized energy. Both weather and solid object targets reflect linearly polarized energy in response to incident linearly polarized energy.

During each of the alternate intervals between the pulses from timer 11 when generator 31 is on and supplying current to polarization switch 26, the radar system antenna radiates a microwave pulse of circularly polarized energy as has been described. If an intense weather target such as a thunderstorm or heavy rain bearing cloud is in the path of the foregoing transmitted energy, a substantial portion of each radiated pulse is reflected as circularly polarized pulse energy back to the antenna of the radar system.

As is apparent from Fig. 3, generator 31 is on during alternate intervals between trigger pulses from timer 11 and the polarizatiton switch 26 is in the same condition for reflected circular or elliptically polarized energy as it is during transmission of the circularly polarized radar pulses during such intervals. In such a condition, switch 26 has the characteristic of converting received circularly polarized pulses into linearly polarized pulses wherein the E-vectors of the emergent energy for transmission back to the radar receiver are parallel to the broad walls of wave guide 21. This is in the wrong direction for excitation of wave guide 21 so that the radar receiver 18 cannot detect the reflections from a weather target which are mostly circularly polarized. On the other hand, reflections from solid object targets in response to circularly polarized energy are mostly elliptically polarized. A component of this energy excites wave guide 21 for detection by receiver 18 after passage through switch 26.

It can be seen from Fig. 3 that the gate circuit 33 is open and gate circuit 34 closed during the alternate intervals between trigger pulses from timer 11 during which circularly polarized pulses are transmitted. Thus, any detected video pulse output energy from receiver 18 occurring during the aforesaid intervals in response to solid object target reflections is supplied through gate circuit 33 to indicator 38 for intensity modulation of the beam of cathode ray tube 41.

During the other alternate intervals between the trigger pulses from timer 11 when the current generator 31 is off and the switch 26 operative in a different state, the radar system transmits linearly polarized energy. At such times the system functions as a conventional radar set and both solid object and weather targets are detected by receiver 18. During these intervals gate circuit 34 is open while gate circuit 33 is closed as is indicated in Fig. 3. Thus, detected video pulse energy from both weather and non-weather targets in response to incident linearly polarized energy passes through gate circuit 34 and is supplied to the radar indicator 39 for intensity modulating the beam of cathode ray tube 42.

Since weather target return is only capable of appearing as light on the screen of tube 42 and not tube 41, weather targets always appear to the eye 51 of the observer to be in blue by virtue of the passage of light from tube 42 through glass 48. On the other hand, solid object target return appears on the screens of both tubes 41 and 42. The screens of these tubes should have a suitable persistence so that the light is retained on each screen for a long time compared to the interval between transmitted pulses. Thus, the light from tubes 41 and 42 representative of solid object return combines along their paths to the eye 51 of the observer. Since blue and yellow filters 47 and 48 are positioned as shown in Fig. 1, the foregoing solid object light appears to be gray rather than blue or yellow. Thus, solid object targets are always indicated in gray while weather targets are indicated in blue. Other color combinations are obviously possible.

The details of the polarization switch 26 are shown in Fig. 2. This structure is a perspective view of the wave guide sections 16, 22 and 23 wherein a wall portion of wave guide 23 is broken away. A rectangular ferromagnetic ferrite plate 51 is positioned in the circular wave guide 23 with the plane of plate 51 including the axis of wave guide 23. The plane of plate 51 is at a 45° angle with respect to the direction of polarization of the dominant mode $TE_{11}$ mode energy in circular wave guide 23. The foregoing polarization direction is parallel with the E-vectors of $TE_{10}$ mode energy in wave guide 16 as represented by the arrows between the broad walls of the wave guide 16, in Fig. 2. The direction of polarization of the $TE_{11}$ mode energy in guide 23 can be resolved into two orthogonal components, one of which is parallel to the plane of the plate 51 while the other component thereof is perpendicular thereto.

The dimensions, dielectric constant and permeability characteristics of the ferrite plate 51 are predetermined in the absence of an applied D.-C. magnetizing field for delaying the E-vector orthogonal components parallel to the plane of plate 51 by 180° relative to the E-vector orthogonal components perpendicular thereto. The plate 51 acts as a delay device since it has a high permeability and a high dielectric constant greater than that of air, having a far greater delaying effect on E-vector components parallel to the plane of the plate than perpendicular thereto. Therefore, when ferrite plate 51 is in an unmagnetized state it comprises a differential 180 degree phase shift section with a linearly polarized output emerging therefrom in response to a linearly polarized input oriented as aforedescribed.

An electromagnet having a C-shaped core 53 of ferromagnetic material is positioned about the circular wave guide 23 as shown in Fig. 2 for applying a D.-C. magnetic field to plate 51 in the plane of the plate in a direction transverse the wave guide 23. The core 53 can be magnetized by a winding 54 disposed about core 53. Winding 54 has a pair of terminals 55 and 56 for receiving the output from generator 31 for energization by the current therefrom when generator 31 is triggered by a positive voltage execursion at the output 28 of the bistable generator 27. If generator 31 comprises a vacuum tube, the terminal 55 would be connected to the cathode side of the cathode resistor for the tube, for example, terminal 56 being connected to ground as indicated in Fig. 2. When generator 31 is not conducting current, there is no current flow through winding 54 so that no magnetizing field is applied to plate 51.

When generator 31 is on and conducting current, winding 54 is energized by a D.-C. current for magnetizing the ferrite plate 51 and changing its permeability. The arrangement is designed so that when generator 31 is on and the ferrite plate 51 is magnetized to a predetermined extent, the magnetic permeability of plate 51 is increased so that it will cause the E-vector orthogonal components of microwave energy parallel to the plane of the plate to be delayed by 270° relative to the E-vector orthogonal components perpendicular thereto. Thus, conditions prevail for converting transmitted linear polarized wave energy into circularly polarized waves since the portion of wave guide 23 containing plate 51 then comprises a differential 90 degree phase shift section.

The transmitted circularly polarized energy radiated into space has a certain sense of rotation as viewed along the direction of transmission. If it is subsequently reflected from a spherical target such rain-bearing cloud formation, the reflected energy is still circularly polarized. However, the sense of rotation of the reflected energy as viewed along the direction of transmission back to the antenna system 25 is in an opposite sense. When this reflected energy passes through the section of wave guide 23 containing plate 51, it is converted back into linearly polarized energy since this wave guide section is still operating as a differential 90 degree phase shift section. However, the emergent linearly polarized energy, instead of being perpendicular to the broad walls of rectangular wave guide 16, is parallel thereto. Thus, wave guide 16 is not excited and the radar receiver 18 cannot detect reflected energy from spherical targets in response to transmitted circularly polarized energy.

Reflected energy received by the circular wave guide 23 in response to transmission of circularly polarized energy and reflection from solid object targets is elliptically polarized. The elliptically polarized reflected energy passes through the section of wave guide containing the plate 51 and has an E-vector component in a proper direction for exciting the rectangular wave guide 16 with sufficient power for detection by receiver 18. Thus, it is clearly seen how reflections from solid objects in response to circularly polarized wave energy can be returned to the receiver 21 for detection to the exclusion of reflections from weather targets.

When the current from generator 31 is off, the ferrite plate 51 is demagnetized and its permeability quickly decreases so that only a 180° phase shift is provided for the E-vector component of transmitted microwave energy in the plane of plate 51. Thus, the switch section 26 acts as a differential 180° phase shift section and energy emerging therefrom is still linearly polarized although at a 90° angle relative to the direction of polarization of transmitted energy coming into the section. Reflected energy from both solid objects and weather returns to the foregoing section and is still linearly polarized. This energy is rotated by another 90° by the switch section 26 for proper orientation for exciting the rectangular wave guide 16.

In the illustrated system alternate transmitted pulses are radiated as circularly polarized waves of energy while the remaining alternate transmitted pulses are radiated as linearly polarized waves of energy. It should be apparent to those skilled in the art that alternate groups of pulses of linearly polarized energy and alternate groups of pulses of circularly polarized energy could be transmitted by proper modification of the system. A counting circuit in conjunction with a blocking oscillator for producing a trigger pulse which is a submultiple of the frequency of the trigger pulse from timer 11 could be provided between timer 11 and generator 27, for example. In such a system the persistence of the screens of cathode ray tubes 44 and 45 should be long enough to retain their light representing target reflections for times which are long compared to the time required for transmission and return of succeeding groups of pulses.

Although two separate indicator circuits and cathode ray tubes have been described as being employed, it should be apparent to those skilled in the art that a single indicator having a two-phosphor, two-gun, single-envelope tube with appropriate persistence could be used instead.

Furthermore, if it were desired to use only one conventional radar indicator connected directly to the output of receiver 18 with no requirement for color discrimination between targets, the system still would be useful for discriminating between solid object and weather targets. For example, if switch 29 is closed, weather targets are only detected in response to alternate transmitted pulses while solid object targets are detected in response to all pulses. If switch 29 is opened so that only linearly polarized energy is transmitted, weather targets as well as solid object targets are detected in response to each transmitted pulse. Thus, the intensity of indicator light for weather targets can be raised by opening switch 29 and lowered by closure thereof. Since the intensity of light for a solid object target would remain approximately the same for either position of switch 29 it should be apparent that target discrimination is provided by manually opening and closing switch 29 while viewing the cathode ray tube indicator screen.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A radar system comprising means for generating a series of recurrent pulses of microwave energy, a rectangular wave guide coupled to said generating means, a circular wave guide, a transition section coupling said rectangular to said circular wave guide, a ferrite plate oriented in said circular wave guide in a plane at an angle of 45 degrees with respect to the walls of said rectangular wave guide, and means for applying a recurrent transverse magnetic field to said ferrite plate for changing the magnetic permeability of said plate to thereby change the microwave phase delay properties of said plate recurrently between two values that differ by substantially 90 degrees.

2. A radar system comprising a transmitter for producing a series of linearly polarized pulses of microwave energy, a main wave guide channel connected to the output of said transmitter for supplying said energy to an antenna, said channel including a polarization switch that has a first operating state for delivering linearly polarized energy to the antenna and a second operating state for delivering circularly polarized energy to the antenna, means for periodically actuating said switch alternately between said first and said second operating states, a receiver connected to said main wave guide channel at a point between said transmitter and said switch, and means along said channel between the connection to said receiver and said switch for blocking the passage of linearly polarized energy to the receiver that is polarized at a 90 degree angle relative to the linear polarization of the transmitted energy.

3. The system of claim 2, further including a pair of gate circuits connected to the output of said receiver, one of said gate circuits being in an open operating state at the moment the other is in a closed operating state, means for transposing the operating states of said gate circuits in synchronism with the actuations of said switch, and means for displaying solid object targets and weather targets simultaneously upon a single indicator screen in response to the outputs of said gate circuits.

4. A radar system comprising a transmitter for producing a series of recurrent pulses of linearly polarized microwave energy, an antenna, a rectangular wave guide connected to said transmitter, a circular wave guide connected to said antenna, a microwave transition section joining the ends of said wave guides, a ferrite phase shifter positioned within said circular wave guide, an electromagnet for applying a transverse magnetic field to said phase shifter that is oriented substantially at a 45 degree angle relative to the walls of said rectangular wave guide, and means for energizing said electromagnet recurrently for varying the phase shift properties of the phase shifter between two values that differ by substantially 90 degrees.

5. The system of claim 4, further including a receiver connected to said rectangular wave guide for detecting received energy therein, a pair of gate circuits connected to the output of said receiver, one of said gate circuits being in an open operating state at the moment the other gate circuit is in a closed operating state, means for transposing the operating states of said circuits in synchronism with the recurrent energization of said electromagnet, and means for providing an indication of the energy detected by said receiver in response to the outputs of said gate circuits.

References Cited in the file of this patent

UNITED STATES PATENTS

| | | |
|---|---|---|
| 2,758,298 | Sunstein | Aug. 7, 1956 |
| 2,850,624 | Kales | Sept. 2, 1958 |
| 2,851,681 | Cohn | Sept. 9, 1958 |